US010650297B2

(12) United States Patent
Lewis et al.

(10) Patent No.: US 10,650,297 B2
(45) Date of Patent: May 12, 2020

(54) RFID SYSTEM PRINTER AND METHOD

(71) Applicant: Walmart Apollo, LLC, Bentonville, AR (US)

(72) Inventors: Steven J. Lewis, Bentonville, AR (US); Anthony G. Wind, III, Gravette, AR (US); Richard A. White, Pineville, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/040,084

(22) Filed: Jul. 19, 2018

(65) Prior Publication Data

US 2019/0026615 A1 Jan. 24, 2019

Related U.S. Application Data

(60) Provisional application No. 62/535,453, filed on Jul. 21, 2017.

(51) Int. Cl.
*G06Q 20/20* (2012.01)
*G06Q 30/06* (2012.01)
(Continued)

(52) U.S. Cl.
CPC ........ *G06K 19/0723* (2013.01); *B41J 3/4075* (2013.01); *B41J 3/44* (2013.01);
(Continued)

(58) Field of Classification Search
CPC . B41J 15/042; B41J 3/4075; B41J 3/44; B41J 3/50; G06K 9/0723; G06K 7/10346;
(Continued)

(56) References Cited

U.S. PATENT DOCUMENTS 7,240,824 B2 7/2007 Stockton
7,857,221 B2 12/2010 Kuhno
(Continued)

FOREIGN PATENT DOCUMENTS

WO 2002029706 4/2002

OTHER PUBLICATIONS

"RFID Hitech Tickets"; RFID | BOCA Printers, Thermal Tickets, 3D VIP Passes; https://tlsbocasystems.com/en/13/rfid; printed Nov. 4, 2016; pp. 1-2.
(Continued)

*Primary Examiner* — Dionne Pendleton
(74) *Attorney, Agent, or Firm* — Fitch, Even, Tabin & Flannery LLP

(57) ABSTRACT

In some embodiments, apparatuses and methods are provided herein useful to printing radio frequency identification tag on a sales receipt. In some embodiments, a system comprises a printer, wherein the printer is configured to produce at least a portion of circuitry required for the RFID tag and a control circuit communicatively coupled to the printer, the control circuit configured to identify items associated with a transaction, determine the at least the portion of the circuitry of the RFID tag to be printed, associated the RFID tag with one or more of the items, cause the printer to print the at least the portion of the circuitry required for the RFID tag on the receipt, receive, from an RFID reader, an indication of the RFID tag and indications of RFID tags associated with products, and compare the indications of the RFID tags associated with products and the one or more of the items associated with the RFID tag.

18 Claims, 4 Drawing Sheets

(51) Int. Cl.
*G06K 19/07* (2006.01)
*G06K 19/077* (2006.01)
*G06K 1/12* (2006.01)
*B41J 3/50* (2006.01)
*B41J 15/04* (2006.01)
*B41J 3/407* (2006.01)
*B41J 3/44* (2006.01)
*G06K 7/10* (2006.01)

(52) U.S. Cl.
CPC ............ *B41J 3/50* (2013.01); *B41J 15/042* (2013.01); *G06K 1/121* (2013.01); *G06K 7/10346* (2013.01); *G06K 19/07749* (2013.01); *G06Q 20/202* (2013.01); *G06Q 20/203* (2013.01); *G06Q 20/204* (2013.01); *G06Q 20/209* (2013.01); *G06Q 30/0609* (2013.01); *G06Q 30/0643* (2013.01)

(58) Field of Classification Search
CPC ........... G06K 19/0723; G06K 19/0739; G06K 19/07798; G06K 1/00; H01L 21/02; H01L 31/12; H01L 31/18; G06F 3/0488; G07F 13/025; G07F 7/04; G07F 9/023; G06Q 20/042; G06Q 20/20; G06Q 20/202; G06Q 20/204; G06Q 20/32; G06Q 20/3276; G06Q 20/40; G06Q 30/02; G06Q 30/0238; G06Q 30/0255; G06Q 30/0268; G06Q 20/04; G06Q 20/203; G06Q 20/208; G06Q 30/0185; G07G 1/12; G07G 3/003; A63F 13/327; A63F 13/332; A63F 13/00; A63F 13/10; A63F 13/12; A63F 13/211; A63F 13/235; A63F 13/245; A63F 13/25; A63F 13/31; A63F 13/57; A63F 13/65; A63F 13/69; A63F 13/73; A63F 13/822; A63F 13/825; A63F 13/90; A63F 13/92; A63F 13/95; A63F 13/98; A63F 1/04; A63F 2003/00665; A63F 2003/00826; A63F 2009/2489; A63F 2009/2492; A63F 2011/0072; A63F 2300/1025; A63F 2300/1031; A63F 2300/105; A63F 2300/1062; A63F 2300/405; A63F 2300/406; A63F 2300/5513; A63F 2300/5533; A63F 2300/807; A63H 2200/00; A63H 30/04; A63H 33/26; A63H 3/16; A63H 3/46; A63J 21/00; G08B 13/2414; G08B 13/2417; G08B 13/2434; G08B 13/246; A61J 1/00; B65D 2203/10; B65D 27/30; B65D 55/028; B65D 79/02; H04B 5/0062
See application file for complete search history.

(56) References Cited

U.S. PATENT DOCUMENTS

| | | | |
|---|---|---|---|
| 8,032,414 B2 | 10/2011 | Payne | |
| 8,177,132 B1 | 5/2012 | Bohen | |
| 9,092,685 B2 | 7/2015 | Poole | |
| 2005/0015342 A1* | 1/2005 | Murata | G06Q 20/042 705/45 |
| 2005/0073416 A1* | 4/2005 | Mathewson, II | G06Q 20/202 340/572.1 |
| 2005/0143173 A1* | 6/2005 | Barney | A63F 13/25 463/37 |
| 2006/0033620 A1* | 2/2006 | Mathewson, II | G07G 1/0045 340/572.1 |
| 2007/0083381 A1 | 4/2007 | Farrell | |
| 2007/0216525 A1* | 9/2007 | Toshiaki | G06K 5/02 340/500 |
| 2008/0156865 A1 | 7/2008 | Leifer | |
| 2008/0288413 A1 | 11/2008 | Weber | |
| 2008/0308628 A1* | 12/2008 | Payne | G06Q 20/20 235/381 |
| 2010/0123582 A1* | 5/2010 | Smith | G08B 13/2414 340/572.3 |
| 2014/0180785 A1 | 6/2014 | Argue | |
| 2015/0142592 A1* | 5/2015 | Chauhan | G06Q 20/202 705/21 |
| 2015/0290545 A1* | 10/2015 | Barney | A63H 3/46 463/32 |
| 2016/0110725 A1* | 4/2016 | Bright | A61J 1/00 705/318 |
| 2017/0011452 A1* | 1/2017 | Beckham | G06Q 20/18 |
| 2018/0264347 A1* | 9/2018 | Tran | G16H 50/20 |

OTHER PUBLICATIONS

PCT; App. No. PCT/US2018/042634; International Search Report and Written Opinion dated Sep. 25, 2018.

* cited by examiner

RFID SYSTEM PRINTER AND METHOD

CROSS-REFERENCE TO RELATED APPLICATION

This application claims the benefit of U.S. Provisional Application No. 62/535,453, filed Jul. 21, 2017, which is incorporated by reference in its entirety herein.

TECHNICAL FIELD

This invention relates generally to radio frequency identification technology and, more specifically, production of radio frequency identification tags.

BACKGROUND

Associating data with a single identifier allows for quick recall of the data. For example, a list can be associated with an identifier, such as a numeric, alphanumeric, or pictorial code. The identifier acts as a pointer to the data and a computer system can quickly recall the data based on the identifier. Identifiers, presented as barcodes, are commonly used in retail environments. For example, when printing a receipt, a code is generated, details of the transaction (e.g., date and time information as well as a list of items purchased) are stored and associated with the code, and the code is printed on the receipt as a barcode. While barcodes have many benefits, they also include drawbacks. For example, there must be a line of sight between the barcode and a barcode reader to read the barcode and, typically, only one barcode can be read at a time. Consequently, a need exists for methods, systems, and apparatuses to produce identifiers that overcome these obstacles.

BRIEF DESCRIPTION OF THE DRAWINGS

Disclosed herein are embodiments of systems, apparatuses, and methods pertaining to printing at least a portion of an RFID tag on a receipt. This description includes drawings, wherein.

Figure 1:
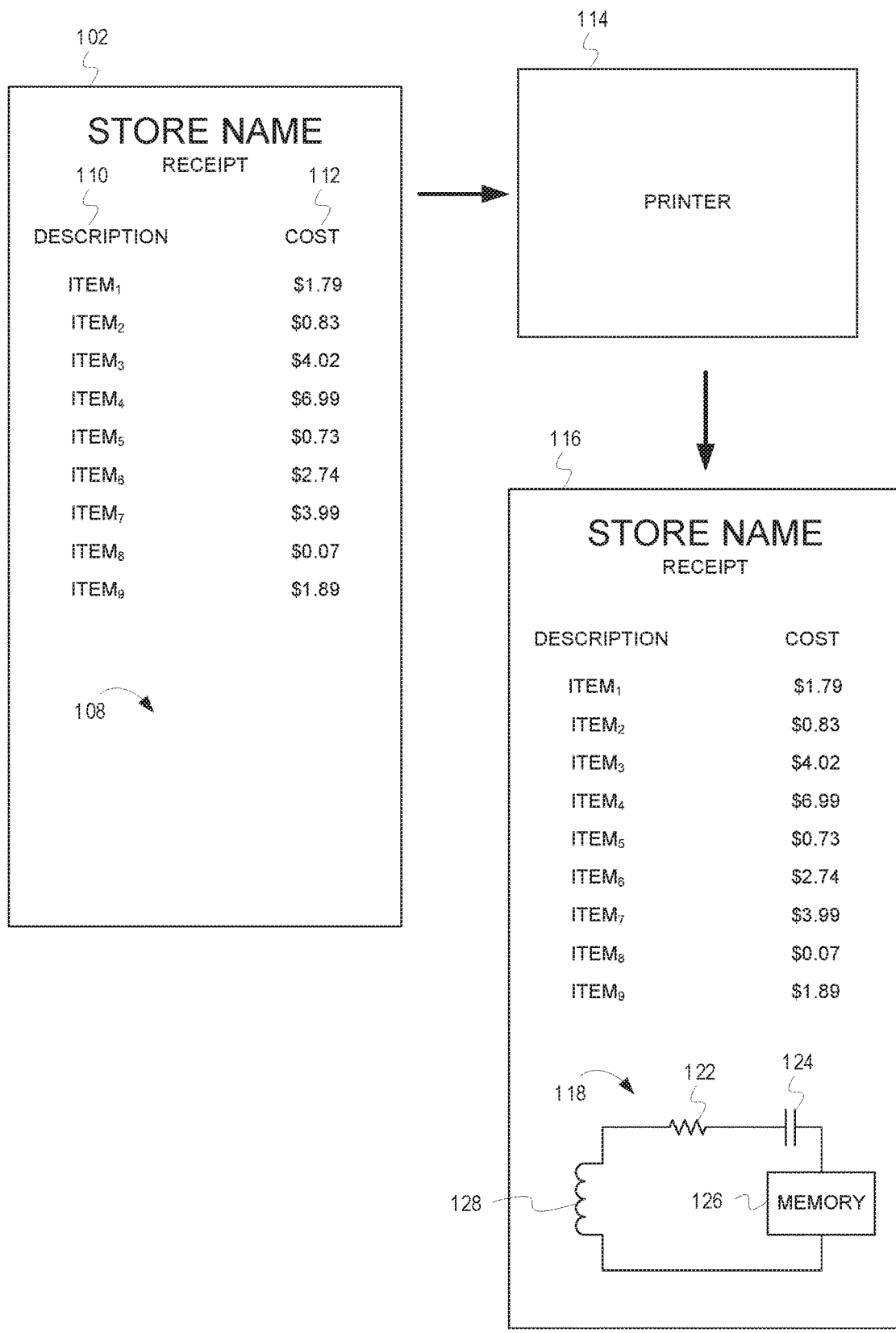
FIG. 1 depicts a first image 102 of a receipt before an RFID tag 118 is printed on the receipt and a second image 116 of the receipt after the RFID tag 118 has been printed on the receipt, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to printing radio frequency identification tag on a sales receipt. In some embodiments, a system comprises a printer, wherein the printer is configured to produce at least a portion of circuitry required for the RFID tag and a control circuit communicatively coupled to the printer, the control circuit configured to identify items associated with a transaction, determine the at least the portion of the circuitry of the RFID tag to be printed, associated the RFID tag with one or more of the items, cause the printer to print the at least the portion of the circuitry required for the RFID tag on the receipt receive, from an RFID reader, an indication of the RFID tag and indications of RFID tags associated with products, and compare the indications of the RFID tags associated with products and the one or more of the items associated with the RFID tag.

As previously discussed, retailers typically rely on barcodes to quickly obtain information about a transaction. For example, when a customer wishes to return or exchange an item, a barcode on his or her receipt is read. The barcode is a visual representation of an identifier with which transaction information (e.g., payment method, items purchased, date and time information, etc.) is associated. After scanning the barcode, the retailer's system (e.g., a point-of-sale (POS) system) can quickly retrieve the information about the transaction. Additionally, one of the biggest benefits of barcodes is that they can be quickly and inexpensively produced (e.g., printed on a receipt).

Although barcodes are useful in a retail environment, they have drawbacks that limit their potential. Specifically, there must be a line of sight between a barcode and a barcode reader to read a barcode. Additionally, with current systems, only one barcode can be read at a time. Though radio frequency identification (RFID) tags overcome many of these drawbacks (i.e., no line of sight is required and many RFID tags can be read simultaneously), they have drawback of their own. For example, RFID tags are not as easily produced as barcodes. That is, while a barcode can be printed on a receipt, an RFID tag cannot be easily printed on a receipt. Rather, a preexisting RFID tag must be adhered to the receipt. This makes automation difficult, and adds to the cost of generating receipts (i.e., it is more difficult to adhere RFID tags to a receipt, and more expensive to purchase the RFID tags, than print barcodes).

Embodiments of the systems, methods, and apparatuses disclosed herein seek to combine the benefits of barcodes and RFID tags to eliminate, or at least minimize, the drawbacks of each technology. For example, some embodiments include a printer that is capable of printing at least a portion of the circuitry required for an RFID tag on a receipt (i.e., a sales receipt). The printer can print memory, an antenna, and/or other circuitry on a receipt using magnetic or conductive ink. In this regard, RFID tags can be quickly and easily generated and printed on a receipt, allowing for ease of use similar to that of barcodes while including all of the benefits of RFID tags. The discussion of FIGS. 1-2 provide an overview of printing RFID tags on receipts.

Figure 2:
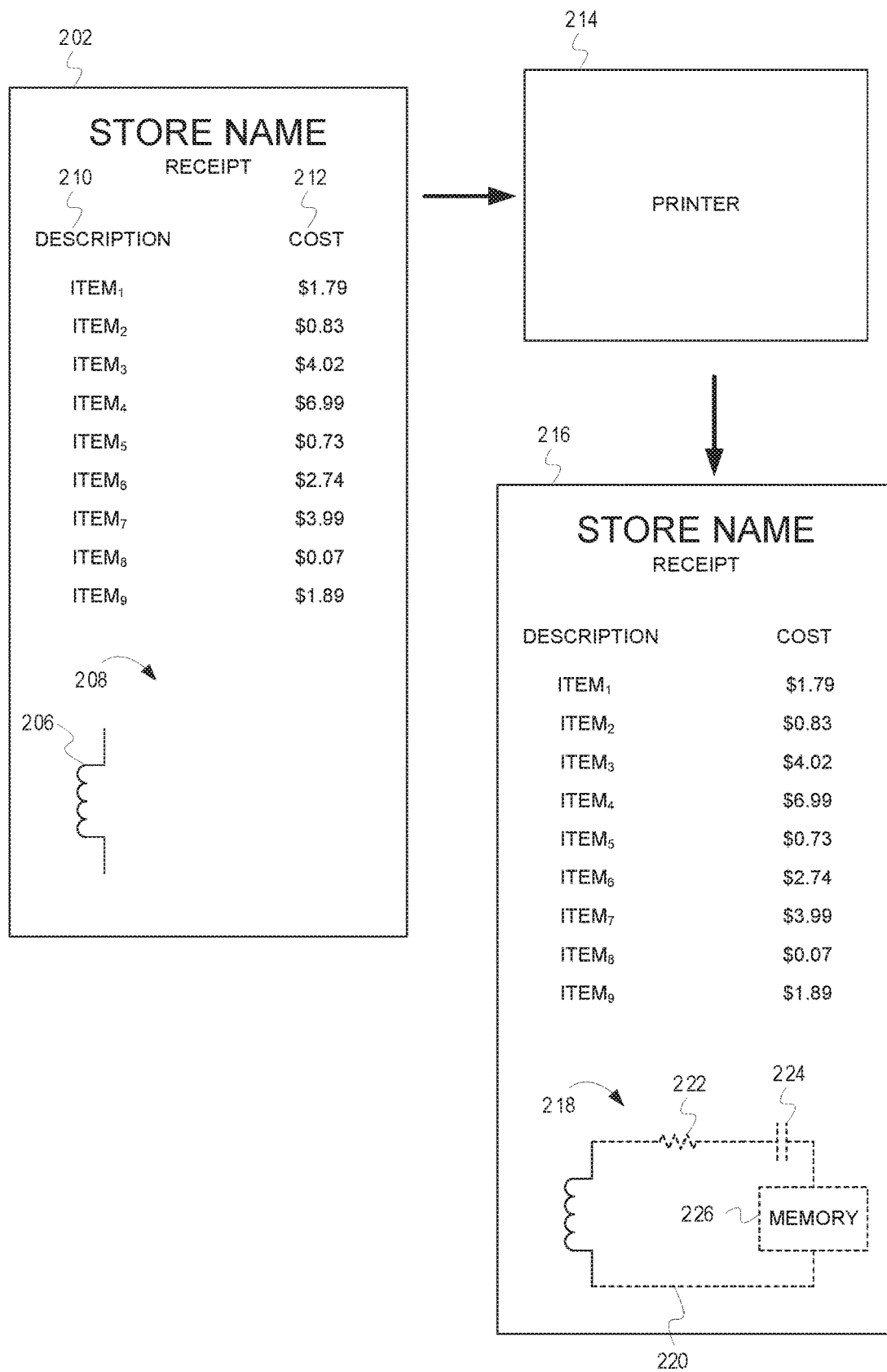
FIG. 2 depicts a first image 202 of a receipt before an RFID tag 218 is printed on the receipt and a second image 216 of the receipt after the RFID tag 218 has been printed on the receipt, according to some embodiments.

FIG. 1 depicts a first image 102 of a receipt before an RFID tag 118 is printed on the receipt and a second image 116 of the receipt after the RFID tag 118 has been printed on the receipt, according to some embodiments. As can be seen in the first image 102 and the second image 116, the receipt includes a first column 110 listing a description of each item purchased in the transaction and a second column 112 listing the cost of each item purchased in the transaction.

The receipt also includes a space 108 in which the RFID tag 118 can be printed. In some embodiments, the printer 114 prints the content of the first column 110 and the second column 112, as well as the RFID tag 118. In other embodiments, a standard printer prints the content of the first column 110 and the second column 112 and the printer 114 prints the RFID tag 118. In either case, the printer 114 prints the RFID tag 118 onto the receipt. For example, the printer 114 can print the RFID tag 118 using metallic or conductive ink.

In the example depicted in FIG. 1, the printer 114 printed the entire RFID tag 118 (i.e., the printer 114 prints all circuitry of the RFID tag 118). The printer 114 has printed an antenna 128 (depicted as an inductor), a resistor 122, a capacitor 124, and memory 126 (e.g., volatile or nonvolatile memory, read only or rewritable memory, etc.). It should be noted that the RFID tag 118 depicted in FIG. 1 (as with the RFID tag depicted in FIG. 2) does not include all circuitry necessary for the RFID tag 118, but rather is simplified in an effort avoid obfuscating the figures.

Much like a traditional barcode, the RFID tag 118 can be associated with all or some of the items purchased in the transaction, as well as additional transaction information. Consequently, the RFID tag 118 can be used in many ways similar to that of a barcode on a receipt (e.g., for returns, indicating items for pickup, indicating payment information, etc.). Additionally, because no line of sight is necessary to RFID tags and multiple RFID tags can be read simultaneously, the RFID tag 118 can be used for additional purposes to which a barcode would not be well-suited. For example, if an exit to a retail facility includes an RFID reader, the RFID reader can read not only the RFID tag 118, but the RFID tags of any item including any RFID tags that are leaving the store (i.e., items having RFID tags). In this example, the items associated with the RFID tag 118 (i.e., the items purchased in the transaction) can be compared with the items leaving the store for inventory management and shrink purposes.

While the discussion of FIG. 1 describes printing the entirety of an RFID tag on a receipt, the discussion of FIG. 2 describes printing a portion of the circuitry necessary for an RFID tag on a receipt.

FIG. 2 depicts a first image 202 of a receipt before an RFID tag 218 is printed on the receipt and a second image 216 of the receipt after the RFID tag 218 has been printed on the receipt, according to some embodiments. The receipt includes a first column 210 listing a description of each item purchased in the transaction and a second column 212 listing the cost of each item purchased in the transaction. In some embodiments, the printer 214 prints the content of the first column 210 and the second column 212, as well at the RFID tag 218. In other embodiments, a standard printer prints the content of the first column 210 and the second column 212, and the printer 214 prints the RFID tag 218.

The receipt includes a space 208 in which the RFID tag 218 is printed. Unlike the example described with respect to FIG. 1 in which the entire RFID tag is printed, in the example depicted in FIG. 2, only a portion of the RFID tag 218 is printed by the printer 214. Specifically, the antenna 206 (depicted as an inductor) is not printed by the printer 214. Rather the receipt includes the antenna 206 before printing. For example, the material of the receipt (e.g., paper) can include multiple antennas 206 at predetermined locations on the material. In such embodiments, the locations of the antennas 206 (i.e., the predetermined locations) can be determined and the printer 214 can print the RFID tag 218 at the predetermined location (i.e., such that the portion of the circuitry printed is properly aligned with the antenna 206). In the example depicted in FIG. 2, the portion of the circuitry of the RFID tag 218 to be printed by the printer 214 includes a resistor 222, a capacitor 224, memory 226, and connective traces 226.

It should be noted that although the example depicted in FIG. 2 shows the antenna 206 as being included on the receipt (i.e., not printed by the printer 214), in some embodiments, other portions of the circuitry of the RFID tag 218 may be included on the receipt (i.e., included on the material of the receipt at predetermined location). For example, the antenna 206, conductive traces 220, and/or the memory 226 may be included on the receipt at predetermined locations and the portion of the circuitry required for the RFID tag 218 (i.e., the portion of the circuitry of the RFID tag 218 to be printed by the printer 214) will include all of the circuitry except the antenna, conductive traces 220, and/or the memory 226.

Figure 3:
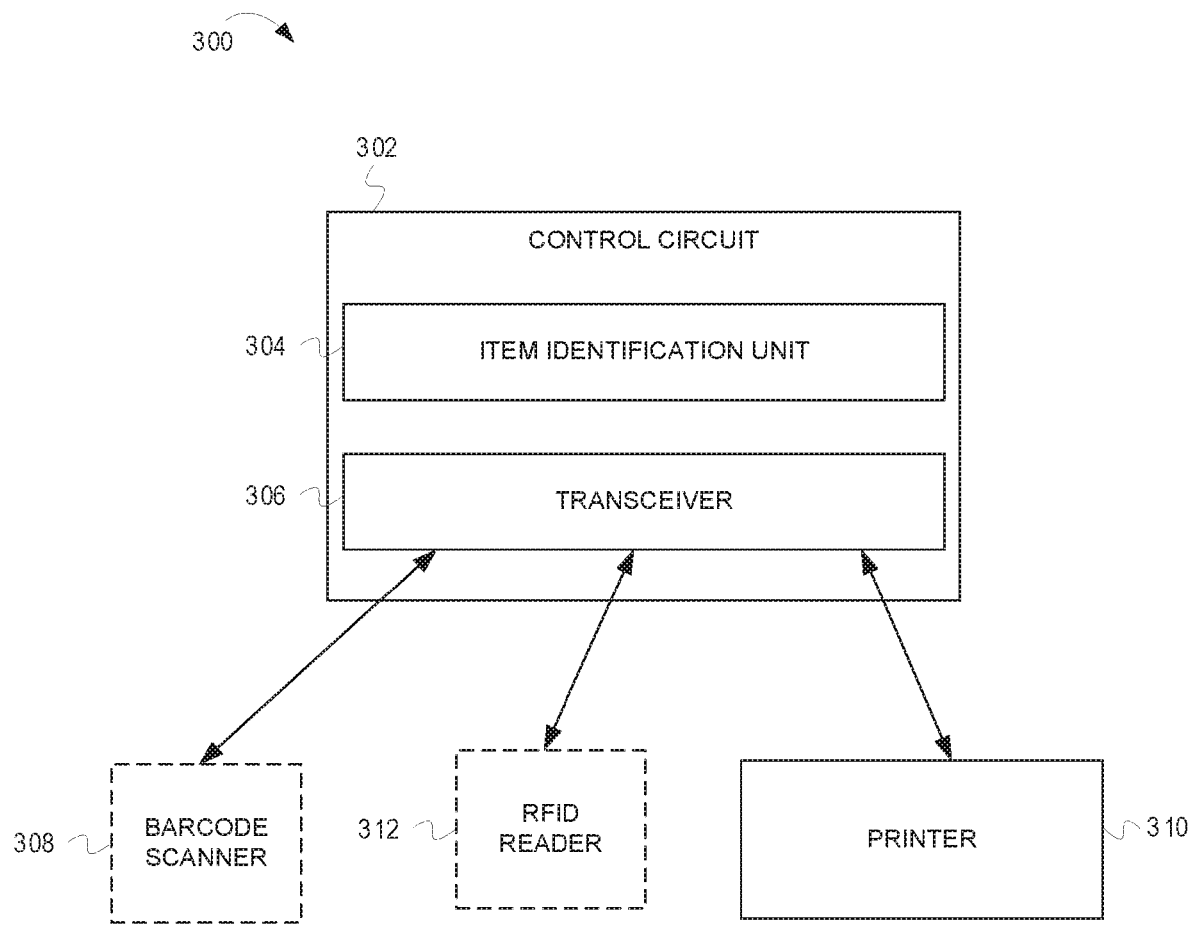
FIG. 3 is a block diagram of a system 300 for printing an RFID tag on a receipt, according to some embodiments.

While the discussion of FIGS. 1-2 provides an overview of printing an RFID tag on a receipt, the discussion of FIG. 3 provides additional details regarding a system for printing an RFID tag on a receipt.

FIG. 3 is a block diagram of a system 300 for printing an RFID tag on a receipt, according to some embodiments. The system 300 includes a control circuit 302 and a printer 310. The control circuit 302 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 302 is configured (for example, by using corresponding programming as will be well understood by those skilled in the art) to carry out one or more of the steps, actions, and/or functions described herein.

By one optional approach the control circuit 302 operably couples to a memory. The memory may be integral to the control circuit 302 or can be physically discrete (in whole or in part) from the control circuit 302 as desired. This memory can also be local with respect to the control circuit 302 (where, for example, both share a common circuit board, chassis, power supply, and/or housing) or can be partially or wholly remote with respect to the control circuit 302 (where, for example, the memory is physically located in another facility, metropolitan area, or even country as compared to the control circuit 302).

This memory can serve, for example, to non-transitorily store the computer instructions that, when executed by the control circuit 302, cause the control circuit 302 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 302 includes an item identification unit 304. The item identification unit 304 identifies items as the items are being scanned (e.g., during the transaction). In one embodiment, the system includes a barcode scanner 308, like a traditional POS terminal. The barcode scanner 308 reads the barcodes of the items and transmits item information (e.g., an indication of the code with which the barcode is associated or information identifying the item) to the item identification unit 304 via the transceiver 306. In other embodiments, the POS terminal can include an RFID reader 312. The RFID reader 312 reads RFID tags of items purchased and transmits item information to the item identification unit 304 via the transceiver 306. In either case, the item identification unit 304 identifies the items associated with the transaction based on the item information.

The control circuit 302 associates an RFID tag with one or more of the items associated with the transaction. For example, the control circuit 302 can generate a new RFID tag identifier and then associate the one or more items associated with the transaction with the RFID tag identifier. The control circuit 302 transmits, via the transceiver 306, an indication of the RFID tag to the printer 310. The printer 310 prints the portion of the circuitry for the RFID tag on a receipt. The portion of the circuitry for the RFID tag can include the entire RFID tag or less than all of the circuitry of the RFID tag.

Figure 4:
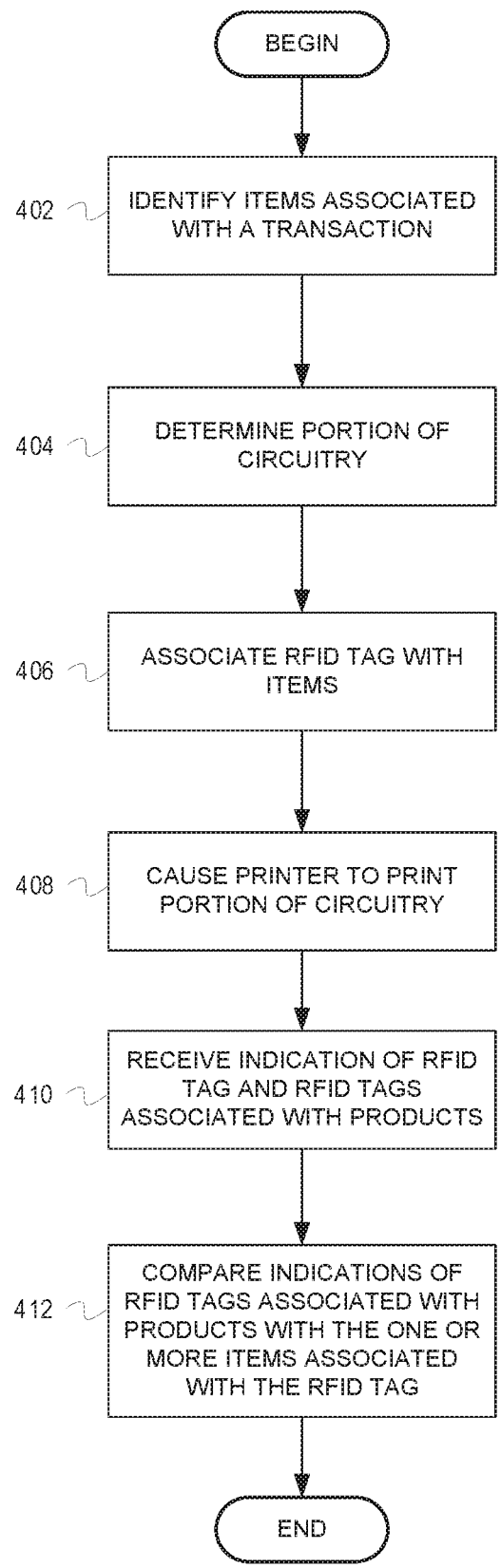
FIG. 4 is a flow chart depicting example operations for printing an RFID tag on a receipt for loss prevention purposes, according to some embodiments.

While the discussion of FIG. 3 provides additional detail regarding a system for printing an RFID tag on a receipt, the discussion of FIG. 4 describes example operations for printing an RFID tag on a receipt.

FIG. 4 is a flow chart depicting example operations for printing an RFID tag on a receipt for loss prevention purposes, according to some embodiments. The flow begins at block 402

At block 402, items associated with a transaction are identified. For example, a control circuit identifies items associated with a transaction. The control circuit can identify items associated with a transaction based on barcodes scanned, or RFID tags read, by a POS terminal. The barcode scanner, or RFID reader, transmits the information to the control circuit. The flow continues at block 404.

At block 404, a portion of the circuitry is determined. For example, the control circuit can determine a portion of the circuitry of the RFID tag to be printed on the receipt. In some embodiments, the portion of the circuitry is the entire RFID tag. In other embodiments, the portion of the circuitry is less than the entire RFID tag. In such embodiments, the material of the receipt may include some of the RFID tag. For example, the material may include the antenna, the memory, or some connective traces. In such embodiments, the material of the receipt may include some of the RFID tag at predetermined locations. In such embodiments, the control circuit can determine the predetermined locations and instruct the printer to print the RFID tag in alignment with one or more of the predetermined locations (i.e., at one or more of the predetermined locations). The flow continues at block 406.

At block 406, the items are associated with the RFID tag. For example, the control circuit can associate one or more of the items in transaction with the RFID tag. In some embodiments, the control circuit generates a new RFID tag (e.g., a new RFID tag identifier) and associates the items with the new identifier. In other embodiments, the control circuit may receive an identifier and associate the items with the received identifier. The control circuit can associate all of the items, or only a portion of the items with the RFID tag. In some embodiments, the control circuit can also associate additional information with the RFID tag. For example, the control circuit can indicate transaction information, such as an item for pickup, payment information, etc. In such embodiments, the control circuit associates the transaction information with the RFID tag. The flow continues at block 408.

At block 408, the printer is caused to print the portion of the circuitry. For example, the control circuit can cause the printer to print the portion of the circuitry for the RFID tag. As previously discussed, the portion of the circuitry can include the entire RFID tag or less than the entire RFID tag. The flow continues at block 410.

At block 410, an indication of the RFID tag and RFID tags associated with products is received. For example, the control circuit can receive the indication of the RFID tag and the RFID tags associated with products from an RFID reader. The indication of the RFID tag can be an identifier of the RFID tag that was printed on the receipt. The indications of RFID tags associated with products can be identifiers of RFID tags associated with items in, for example, a customer's cart and/or carried by the customer. In some embodiments, the RFID reader is located near an exit door. In such embodiments, the RFID reader reads the RFID tag printed on the receipt and the RFID tag associated with products as the customer leaves the retail facility. The flow continues at block 412.

At block 412, indications of the RFID tags associated with products are compared to the one or more items associated with the RFID tag. For example, the control circuit can compare the indications of the RFID tags associated with the products in the customer's cart with the one or more items indicated on the RFID tag printed on the customer's receipt. In some embodiments, all of the items included in the transaction are associated with the RFID tag. Accordingly, if there is a product in the customer's cart that is not associated with the RFID tag printed on the receipt, it may indicate that there is a problem. For example, an employee may have failed to include one of the products in the transaction or someone may be attempting to steal the product. In other embodiments, only some of the items included in the transaction are associated with the RFID tag printed on the receipt. For example, only items conforming to certain sizing requirements, weight requirements, pricing requirements, etc. may be associated with the RFID tag printed on the receipt. In such embodiments, the control circuit may be aware of this criteria and can ignore items that are not associated with the RFID tag printed on the receipt if they are not supposed to be. In either case (i.e., whether all of the items or only some of the items in the transaction are associated with the RFID tag printed on the receipt), in some embodiments, an employee is alerted when a discrepancy is discovered. For example, the control circuit can transmit a notification to the employee indicating that one of the items passing the RFID reader is not included on the receipt.

Generally speaking, pursuant to various embodiments, systems, apparatuses, and methods are provided herein useful to printing radio frequency identification tag on a sales receipt. In some embodiments, a system comprises a printer, wherein the printer is configured to produce at least a portion of circuitry required for the RFID tag and a control circuit communicatively coupled to the printer, the control circuit configured to identify items associated with a transaction, determine the at least the portion of the circuitry of the RFID tag to be printed, associated the RFID tag with one or more of the items, cause the printer to print the at least the portion of the circuitry required for the RFID tag on the receipt receive, from an RFID reader, an indication of the RFID tag and indications of RFID tags associated with products, and compare the indications of the RFID tags associated with products and the one or more of the items associated with the RFID tag.

In some embodiments, an apparatus and a corresponding method performed by the apparatus comprises identifying items associated with a transaction, determining at least a portion of circuitry required for the RFID tag to be printed, associating the RFID tag with one or more of the items, causing a printer to print the at least a portion of the circuitry required for the RFID tag on the receipt receiving, from an RFID reader, an indication of the RFID tag and indications of RFID tags associated with products, and comparing the indications of the RFID tags associated with products and the one or more of the items associated with the RFID tag.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for printing a radio frequency identification (RFID) tag on a receipt for a commercial transaction at a retail facility for loss prevention purposes, the system comprising:
    a printer, wherein the printer is configured to produce at least a portion of circuitry required for the RFID tag, and wherein the printer is located at a point-of-sale (POS) terminal; and
    a control circuit communicatively coupled to the printer, the control circuit configured to:
        identify items associated with a transaction;
        determine the at least a portion of the circuitry of the RFID tag to be printed, wherein the at least a portion of the circuitry for the RFID tag includes one or more physical components of the RFID tag;
        associate the RFID tag with one or more of the items;
        determine a location of an antenna on the receipt, wherein the receipt is printed from a roll of paper, wherein the roll of paper includes a plurality of antennas, and wherein the antenna is one of the plurality of antennas;
        cause the printer to print the at least a portion of the circuitry required for the RFID tag on the receipt, wherein the at least a portion of the circuitry required for the RFID tag is aligned with the antenna such that the at least a portion of the circuitry required for the RFID tag is electrically coupled to the antenna;
        receive, from an RFID reader, an indication of the RFID tag and indications of RFID tags associated with products, wherein the RFID reader is located at an exit of the retail facility; and
        compare the indications of the RFID tags associated with products and the one or more of the items associated with the RFID tag.
2. The system of claim 1, wherein the at least a portion of the circuitry required for the RFID tag includes one or more of a capacitor and a resistor.
3. The system of claim 1, wherein the at least a portion of the circuitry required for the RFID tag includes read only memory (ROM).
4. The system of claim 3, wherein the plurality of antennas are located at a predetermined locations on the receipt.
5. The system of claim 1, wherein the at least a portion of the circuitry required for the RFID tag includes all of the RFID tag except the antenna.
6. The system of claim 1, wherein the printer is configured to produce the at least a portion of the circuitry required for the RFID tag via one or more of conductive ink and magnetic ink.
7. The system of claim 1, wherein the control circuit is further configured to:
    determine that at least one of the products is not included in the transaction; and
    transmit, to an employee terminal, a notification.
8. The system of claim 1, wherein the RFID tag indicates payment information.
9. The system of claim 1, wherein the RFID reader is located at an exit door.
10. A method for printing a radio frequency identification (RFID) tag on a receipt for a commercial transaction at a retail facility, the method comprising:
    identifying items associated with a transaction;
    determining at least a portion of circuitry required for the RFID tag to be printed, wherein the at least a portion of the circuitry for the RFID tag includes one or more physical components of the RFID tag;
    associating the RFID tag with one or more of the items;
    determining a location of an antenna on the receipt, wherein the receipt is printed from a roll of paper, wherein the roll of paper includes a plurality of antennas, and wherein the antenna is one of the plurality of antennas;
    causing a printer to print the at least a portion of the circuitry required for the RFID tag on the receipt, wherein the printer is located at a point-of-sale (POS) terminal, and wherein the at least a portion of the circuitry required for the RFID tag is aligned with the antenna such that the at least a portion of the circuitry required for the RFID tag is electrically coupled to the antenna;
    receiving, from an RFID reader, an indication of the RFID tag and indications of RFID tags associated with products, wherein the RFID reader is located at an exit of the retail facility; and
    comparing the indications of the RFID tags associated with products and the one or more of the items associated with the RFID tag.
11. The method of claim 10, wherein the at least a portion of the circuitry required for the RFID tag includes one or more of a capacitor and a resistor.
12. The method of claim 10, wherein the at least a portion of the circuitry required for the RFID tag includes read only memory (ROM).
13. The method of claim 12, wherein the plurality of antennas are located at a predetermined locations on the receipt.
14. The method of claim 10, wherein the at least a portion of the circuitry required for the RFID tag includes all of the RFID tag except the antenna.
15. The method of claim 10, wherein the printer is configured to produce the at least a portion of the circuitry required for the RFID tag via one or more of conductive ink and magnetic ink.
16. The method of claim 10, the method further comprising:
    determining that at least one of the products is not included in the transaction; and transmitting, to an employee terminal, a notification.

17. The method of claim 10, wherein the RFID tag indicates payment information.

18. The method of claim 10, wherein the RFID reader is located at an exit door.

\* \* \* \* \*